No. 834,894. PATENTED NOV. 6, 1906.
W. M. DRAVO & W. H. FRINK.
GLASS POT HANDLING APPARATUS.
APPLICATION FILED NOV. 20, 1905.

WITNESSES
R. A. Balderson.
Warren W. Swartz.

INVENTORS
W. M. Dravo
W. H. Frink
by Bakewell & Byrnes
their attys

UNITED STATES PATENT OFFICE.

WILLIAM M. DRAVO AND WILLIAM H. FRINK, OF NORTH BELLE VERNON, PENNSYLVANIA, ASSIGNORS TO WINDOW GLASS MACHINE COMPANY, OF PITTSBURG, PENNSYLVANIA, A CORPORATION OF NEW JERSEY.

GLASS-POT-HANDLING APPARATUS.

No. 834,894.     Specification of Letters Patent.     Patented Nov. 6, 1906.

Application filed November 20, 1905. Serial No. 288,153.

*To all whom it may concern:*

Be it known that we, WILLIAM M. DRAVO and WILLIAM H. FRINK, both of North Belle Vernon, Fayette county, Pennsylvania, have invented a new and useful Glass-Pot-Handling Apparatus, of which the following is a full, clear, and exact description, reference being had to the accompanying drawings, forming part of this specification, in which—

Figure 1:
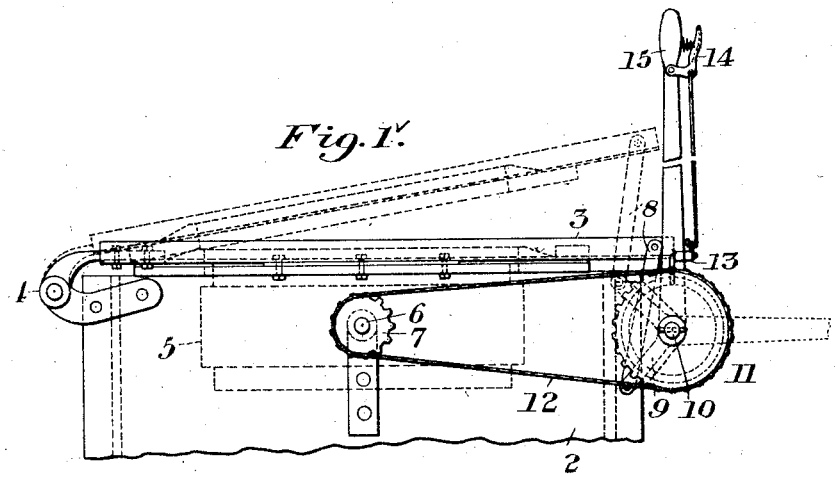
Figure 2:
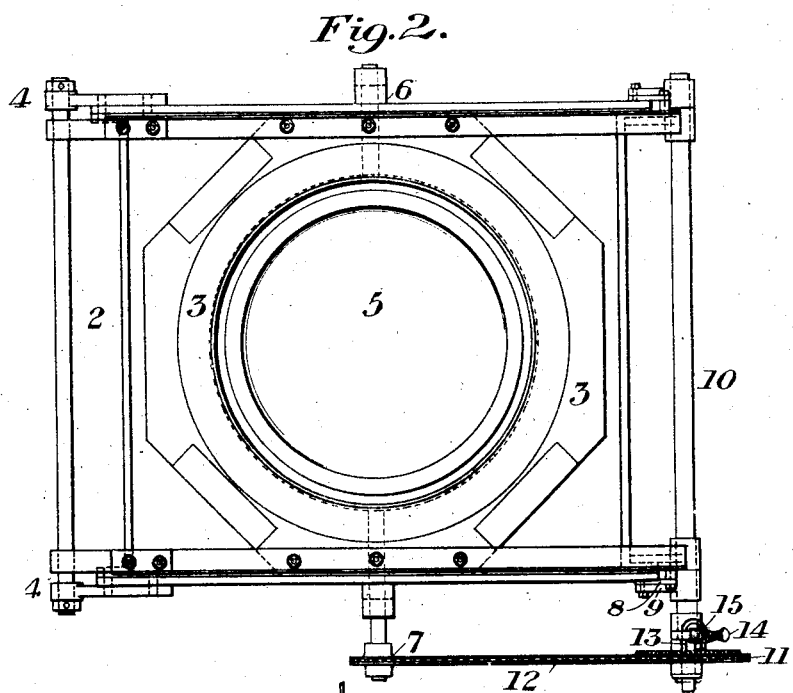
Figure 3:
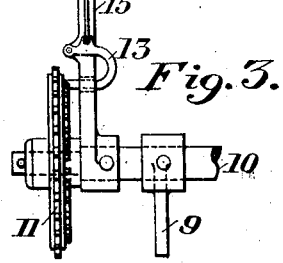

Figure 1 is a partial side elevation of a drawing kiln or pot constructed in accordance with our invention. Fig. 2 is a top plan view of the same, and Fig. 3 is a detail view of the spring-latch or clutch connection which we employ.

Our invention relates to glass-pot furnaces or drawing-kilns, particularly those employed for the drawing of glass articles, such as cylinders, &c., wherein a double pot is employed, which is turned over between the drawing operations.

The object of our invention is to do away with the raising and lowering of the pots which has heretofore been necessary and to turn the pot in stationary bearings. We obtain this object by moving the top stone of the furnace vertically, either by hinging and tilting it or by moving it upward and downward in substantially parallel lines. We also preferably provide apparatus by which the lifting of the top stone and the turning of the pot can be carried out in a certain time relation to each other.

In the drawings, 2 represents the walls of the pot-furnace, and 3 the top stone or cover, which is preferably made of cast-iron and is hinged at one end, as shown at 4. The cover is shown as provided with a large central hole through which the article is drawn.

The pot 5, which is shown in dotted lines in Fig. 1, is trunnioned in stationary bearings 6 6 in the sides of the furnace structure, and one of the trunnions is extended and provided with a sprocket-wheel 7.

The free end of the top stone is connected by pivoted links 8 with levers 9, secured to and projecting from a cross-shaft 10. On the end of the shaft 10 is loosely mounted a sprocket-wheel 11, over which and the sprocket-wheel 7 extends chain 12.

The inner face of the sprocket-wheel 11 is provided with an annular series of teeth, which may be engaged by a spring-pressed dog 13, operated by the hand-latch device 14, connected to the hand-lever 15. The hand-lever 15 is secured to the shaft 10, so that whenever such lever is operated the top stone will be raised or lowered according to the direction of movement.

In the use of the apparatus when it is desired to reverse the position of the pot the operator presses on the spring-latch to withdraw it from the sprocket-wheel and then moves the lever to swing the stone through the link connections. After the top stone or cover has reached its highest point the operator releases the spring-latch and reverses the movement of the lever, allowing it to return. On this reverse movement the pot will be turned and the top stone will assume its original position.

The advantages of our invention result from the moving of the top stone in connection with the turning of the pot. This does away with the raising and lowering of the pot, which has heretofore been necessary with stationary top stones. The furnaces or kilns may be arranged in series with a continuous revolving shaft common to all of them. The shaft may be driven by an electric motor or other suitable means and provided with clutches for operating the covers.

The mechanism for raising the cover and turning the pot may be varied widely, and their relative movements may be obtained in different ways without departing from our invention.

We claim—

1. A pot-furnace having a swinging pot, and a vertically-movable top stone normally in the path of the pot; substantially as described.

2. A pot-furnace having a reversible pot revolubly mounted in stationary bearings, and a tilting top stone normally within the path of the pot; substantially as described.

3. A furnace having a turning pot, and a tilting top stone normally within the path of the pot, and mechanism for simultaneously moving the top stone and turning the pot; substantially as described.

4. A furnace having a movable top stone and a tilting pot, connections for tilting the pot, connections for moving the top stone, and means for operating said elements simultaneously or separately as desired; substantially as described.

5. A furnace having a reversible pot mounted in stationary bearings, a tilting top stone, a shaft having link connection with the top stone and clutch connection between said shaft and the reversible pot; substantially as described.

In testimony whereof we have hereunto set our hands.

WILLIAM M. DRAVO.
WILLIAM H. FRINK.

Witnesses:
HELEN HAGERTY,
M. E. BARLOW.